United States Patent
Takahashi et al.

(10) Patent No.: US 12,240,305 B2
(45) Date of Patent: Mar. 4, 2025

(54) LEFT-RIGHT WHEEL DRIVING DEVICE

(71) Applicant: MITSUBISHI JIDOSHA KOGYO KABUSHIKI KAISHA, Tokyo (JP)

(72) Inventors: Naoki Takahashi, Tokyo (JP);
Kiminobu Terao, Tokyo (JP);
Motoharu Chiba, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 17/433,931

(22) PCT Filed: Dec. 24, 2019

(86) PCT No.: PCT/JP2019/050664
§ 371 (c)(1),
(2) Date: Aug. 25, 2021

(87) PCT Pub. No.: WO2020/179202
PCT Pub. Date: Sep. 10, 2020

(65) Prior Publication Data
US 2022/0048375 A1 Feb. 17, 2022

(30) Foreign Application Priority Data
Mar. 6, 2019 (JP) .................. 2019-040350

(51) Int. Cl.
*B60K 1/02* (2006.01)
*B60K 17/04* (2006.01)
(Continued)

(52) U.S. Cl.
CPC ............... *B60K 1/02* (2013.01); *B60K 17/04* (2013.01); *B60L 15/2036* (2013.01);
(Continued)

(58) Field of Classification Search
CPC .......... B60K 1/02; B60K 17/04; B60K 17/16; B60K 2023/043; B60L 15/2036;
(Continued)

(56) References Cited

U.S. PATENT DOCUMENTS 5,419,406 A * 5/1995 Kawamoto ............... B60K 1/02
475/5
7,867,125 B2 * 1/2011 Kim ..................... B60K 17/046
475/221

(Continued)

FOREIGN PATENT DOCUMENTS

CN 103998268 A 8/2014
CN 197339399 A 11/2017
(Continued)

OTHER PUBLICATIONS

Office Action dated Jan. 17, 2023 in corresponding Japanese Patent Application No. 2021-503428 with English Translation.
(Continued)

Primary Examiner — Victor L MacArthur
(74) Attorney, Agent, or Firm — Birch, Stewart, Kolasch & Birch, LLP

(57) ABSTRACT

In a left-right wheel driving device (10) including two motors (1, 2) that drive left and right wheels and a gear mechanism (3) that amplifies a torque difference between the two motors (1, 2) and transmits the amplified torques to the left and right wheels, respective, rotating shafts (1A, 2A) of the two motors (1, 2) are coaxially disposed. The left-right wheel driving device (10) further includes motor shafts (11) that are positioned between the rotating shafts (1A, 2A) coaxially with the rotating shafts (1A, 2A) and that are each provided with a motor gear (21), counter shafts (12) that are disposed in parallel to the motor shafts (11) and that are each provided with a first intermediate gear (22) meshing with the motor gear (21) and a second intermediate gear (23) having
(Continued)

a diameter smaller than that of the first intermediate gear (22), and output shafts (13) that are disposed in parallel to the motor shafts (11) and that are each provided with an output gear (24) meshing with the second intermediate gear (23). The gear mechanism (3) is disposed on one end side of each of the output shafts (13) and one of the left and right wheels is disposed on the other end side of the output shaft (13).

7 Claims, 4 Drawing Sheets

(51) Int. Cl.
*B60L 15/20* (2006.01)
*F16H 57/02* (2012.01)

(52) U.S. Cl.
CPC ... *F16H 57/02* (2013.01); *F16H 2057/02034* (2013.01); *F16H 2057/02052* (2013.01); *F16H 2702/02* (2013.01)

(58) Field of Classification Search
CPC ............. B60L 2220/46; B60L 2240/22; B60L 2240/423; F16H 57/02; F16H 2057/02034; F16H 2057/02052; F16H 2702/02; F16H 2048/106; F16H 2048/364; F16H 2048/365; F16H 2048/366; F16H 2048/367; F16H 2048/368; F16H 2200/0021; F16H 48/10; F16H 48/36; B60Y 2200/91; Y02T 10/64; Y02T 10/72
See application file for complete search history.

(56) References Cited

U.S. PATENT DOCUMENTS

| | | | |
|---|---|---|---|
| 9,221,334 B2 * | 12/2015 | Knoblauch | B60K 1/02 |
| 2011/0281684 A1 * | 11/2011 | Ushiroda | F16H 48/36 |
| | | | 475/331 |
| 2014/0371016 A1 | 12/2014 | Knoblauch | |
| 2017/0313182 A1 | 11/2017 | Isono et al. | |
| 2018/0162215 A1 | 6/2018 | Albl et al. | |
| 2019/0264790 A1 | 8/2019 | Suzuki et al. | |
| 2020/0292041 A1 | 9/2020 | Zheng et al. | |

FOREIGN PATENT DOCUMENTS

| | | | |
|---|---|---|---|
| CN | 108177513 A | 6/2018 | |
| CN | 109888813 A | 6/2019 | |
| EP | 3287666 A1 * | 2/2018 | ............... B60K 1/02 |
| JP | 11-240349 A | 9/1999 | |
| JP | 2017-145874 A | 8/2017 | |
| JP | 2017-203503 A | 11/2017 | |
| JP | 2018-54099 A | 4/2018 | |
| JP | 2018-84315 A | 5/2018 | |
| JP | 2018-155327 A | 10/2018 | |
| WO | 2018/012189 A1 | 1/2018 | |

OTHER PUBLICATIONS

Office Action dated Sep. 13, 2022 issued in the corresponding Japanese Patent Application No. 2021-503428 with an English Translation.
English translation of International Preliminary Report on Patentability and Written Opinion of the International Searching Authority for International Application No. PCT/JP2019/050664, dated Aug. 25, 2021.
Chinese Office Action and Search Report for Chinese Application No. 201980093639.X, dated Sep. 7, 2023, with an English translation.
International Search Report (PCT/ISA/210) issued in PCT/JP2019/050664, dated Mar. 3, 2020.
Written Opinion of the International Searching Authority (PCT/ISA/237) issued in PCT/JP2019/050664, dated Mar. 3, 2020.
Chinese Office Action and Search Report for Chinese Application No. 201980093639.X, dated Apr. 28, 2023, with an English translation.
Japanese Office Action for Japanese Application No. 2021-503428, dated May 9, 2023, with an English translation.
Chinese Office Action for Chinese Application No. 201980093639.X, dated Nov. 25, 2023, with English translation.

* cited by examiner

3 : GEAR MECHANISM

LEFT-RIGHT WHEEL DRIVING DEVICE

TECHNICAL FIELD

This disclosure relates to a left-right wheel driving device including two motors that drives the left and right wheels of a vehicle, and a gear mechanism that amplifies a torque difference between the two motors and transmits torques to the left and right wheels.

BACKGROUND ART

Conventionally, a vehicle has been known which is provided with an amplifier mechanism that, when transmitting the driving torque from two independent motors to the left and right driving wheels, amplifies a difference (torque difference) between two driving torques and transmits the amplified torque. The presence of such an amplifier mechanism brings an advantage that can provide a large torque difference to the left and right wheels but also a disadvantage that increases the size of the overall driving device. For example, a structure that disposes two motors on a vehicle shaft has difficulty in avoiding an increase of the dimension in the vehicle width direction. For the above, a device for driving a vehicle that transmits a difference of driving torque from the motors to an amplifier mechanism without arranging motors on the vehicle shaft has been proposed (e.g., see Patent Document 1).

PRIOR ART REFERENCES

Patent Document

[Patent Document 1] Japanese Laid-open Patent Publication No. 2017-203503

SUMMARY

Problems

However, in the structure of the first embodiment of Patent Document 1 described above (e.g., FIGS. 1 and 2), the power transmission paths from the motors to the left and right driving wheels are too long to reduce the size of the driving device. Further, although having shorter power transmission paths from the motors to the left and right driving wheels than that of the first embodiment, the structures of the second embodiment (e.g., FIGS. 7 and 8) and the third embodiment (e.g., FIGS. 11 and 12) of Patent Document 1 each have a single gear train (only a single gear train is provided to the counter gear) that reduces the rotation speed of the motors and therefore have a room for improvement to transmit sufficient torque (torque difference) to the left and right wheels.

With the foregoing problems in view, one of the objects is to provide a compact driving device that includes a reduction gear train that reduces the rotation speed of the motors and a gear mechanism that amplifies the torque difference between the two motors. It addition to the above object, an advantageous effect that is derived from each configuration shown in the following detailed modes to carry out the present disclosure and which is not obtained by the conventional technique can be regarded as another object of the present disclosure.

Means to Solve Problem (1) A left-right wheel driving device disclosed herein includes: a first motor and a second motor that drive left and right wheels of a vehicle, and a gear mechanism that amplifies a torque difference between the first motor and the second motor and transmits the amplified torques to the left and right wheels. In this left-right wheel driving device, rotating shafts of the first motor and the second motor are coaxially disposed. The left-right wheel driving device further includes motor shafts that are positioned between the rotating shafts coaxially with the rotating shafts and that are each provided with a motor gear, counter shafts that are disposed in parallel to the motor shafts and that are each provided with a first intermediate gear meshing with the motor gear and a second intermediate gear having a diameter smaller than that of the first intermediate gear, and output shafts that are disposed in parallel to the motor shafts and that are each provided with an output gear meshing with the second intermediate gear. The gear mechanism is disposed on one end side of each of the output shafts and one of the left and right wheels is disposed on the other end side of the output shaft.

(2) The motor shafts are preferably positioned between the first motor and the second motor; the second intermediate gear is disposed nearer to one of the first motor and the second motor than the first intermediate gear; and the gear mechanism is disposed between the output gear on a side of the first motor and the output gear on a side of the second motor.

(3) The counter shafts are preferably disposed such that the first intermediate gears are positioned inside outer circumference faces in radius directions of the first motor and the second motor in a side view.

(4) The output shafts are preferably disposed such that the output gears partially overlap the first motor and the second motor in a side view.

(5) The counter shafts are preferably disposed below an imaginary line connecting the motor shafts with the output shafts in a side view.

(6) The left-right wheel driving device preferably further includes: a casing that is coupled to motor housings of the first motor and the second motor and that contains at least the motor shafts; and an inlet that is disposed on an upper part of the casing and that supplies oil inside the motor housings and inside the casing. Preferably, the motor shafts are disposed between the first motor and the second motor, and the inlet is disposed at a space between the two motor housings.

(7) Each of the output shafts is preferably pivotally supported by two bearings spaced apart from each other and comprises a joint part on an end on an outer side in a vehicle width direction; and the joint parts are preferably each disposed outside one of edge faces of the first motor and the second motor in the vehicle width direction.

Effect

The left-right wheel driving device disclosed herein can achieve a compact device for driving left and right wheels incorporating a gear mechanism having a reduction gear train for reducing the rotation speed of the motors and a function for amplifying a torque difference.

DETAILED DESCRIPTION

Description will now be made in relation to a left-right wheel driving device according to an embodiment with reference to the accompanying drawings. The following embodiment is merely illustrative and is not intended to exclude the application of various modifications and techniques not explicitly described in the embodiment. Each configuration of the present embodiment can be variously modified and implemented without departing from the scope thereof. Also, the configuration can be selected or omitted according to the requirement or appropriately combined.

1. Configuration

Figure 1:
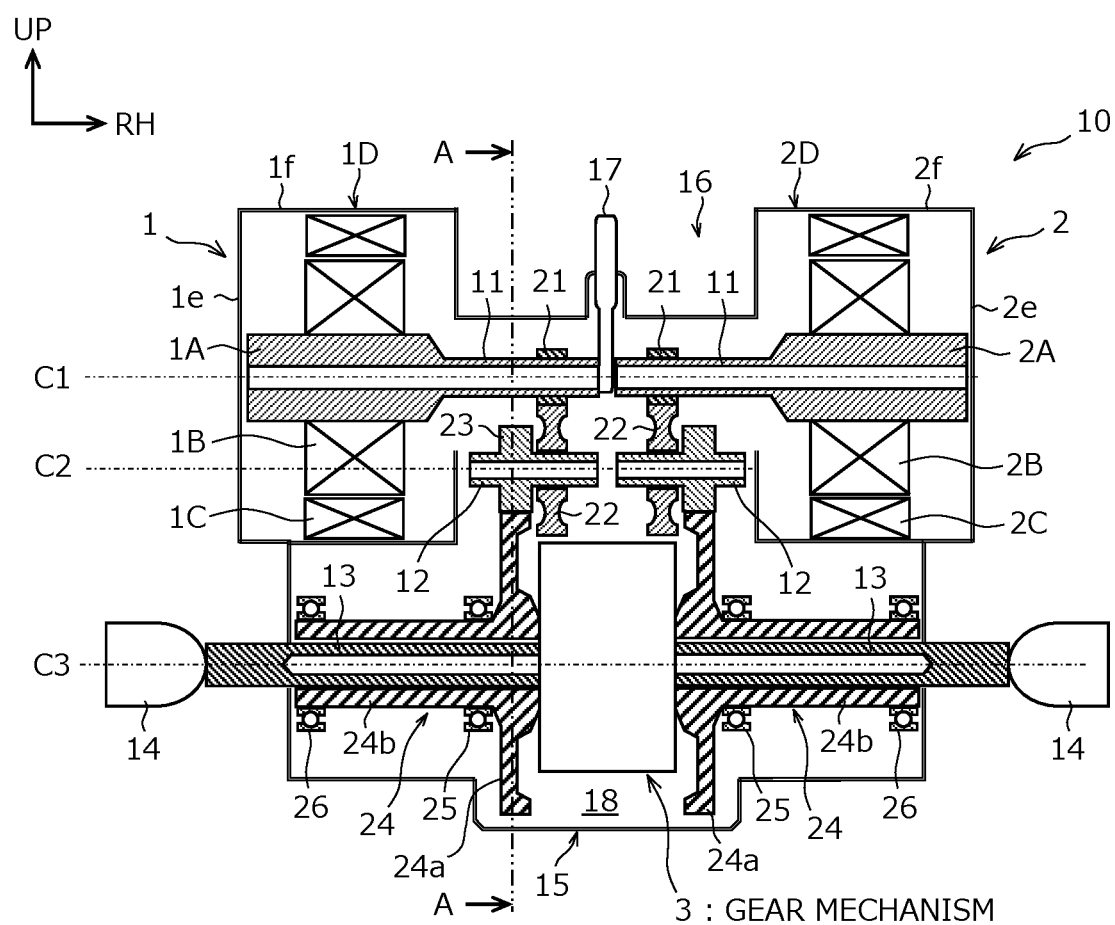
FIG. 1 is a schematic diagram showing the structure of a left-right wheel driving device according to an embodiment.

A left-right wheel driving device (hereinafter referred to as "driving device 10") of the present embodiment is shown in FIG. 1. This driving device 10 is a differential device for a vehicle having an AYC (Active Yaw Control) function and is interposed between the left and right wheels. The AYC function adjusts the magnitude of the yaw moment by controlling the share ratio of the driving force (driving torque) on the left and right driving wheels independently, and thereby stabilizes the attitude in the yaw direction of the vehicle. Besides the AYC function, the driving device 10 of this embodiment also has a function for transmitting the driving torque to the left and right wheels to run the vehicle and a function for passively absorbing a difference of the rotational speed between the left and right wheels generated when the vehicle is turning.

The driving device 10 includes a first motor 1 and a second motor 2 that drive the left and right wheels, a reduction gear train that transmits while reducing rotation speeds of the first motor 1 and the second motor 2, and a gear mechanism 3 that amplifies a torque difference between the left and right wheels and transmits one of torques having the amplified torque difference to each of the left and right wheels. The first motor 1 is disposed on the left side of the vehicle and the second motor 2 is disposed on the right side of the vehicle. The first motor 1 and the second motor 2 are AC motors driven by the power of a non-illustrated battery and preferably have similar output properties. Torque of each of the left and right drive wheels is variable, and the torque difference between the first motor 1 and the second motor 2 is amplified in the gear mechanism 3 and the torques having the amplified torque difference are transmitted to each of the left and right wheels.

The first motor 1 is provided with a rotor 1B which rotates integrally with a rotating shaft 1A, and a stator 1C fixed to a motor housing 1D. Similarly, the second motor 2 is provided with a rotor 2B which rotates integrally with a rotating shaft 2A, and a stator 2C fixed to a motor housing 2D. The first motor 1 and the second motor 2 are disposed apart from and opposite to each other in such an attitude that both of the two rotating shafts 1A, 2A extend in the vehicle width direction. The rotating shafts 1A, 2A are coaxially disposed so that the respective rotational centers C1 match.

Figure 2:
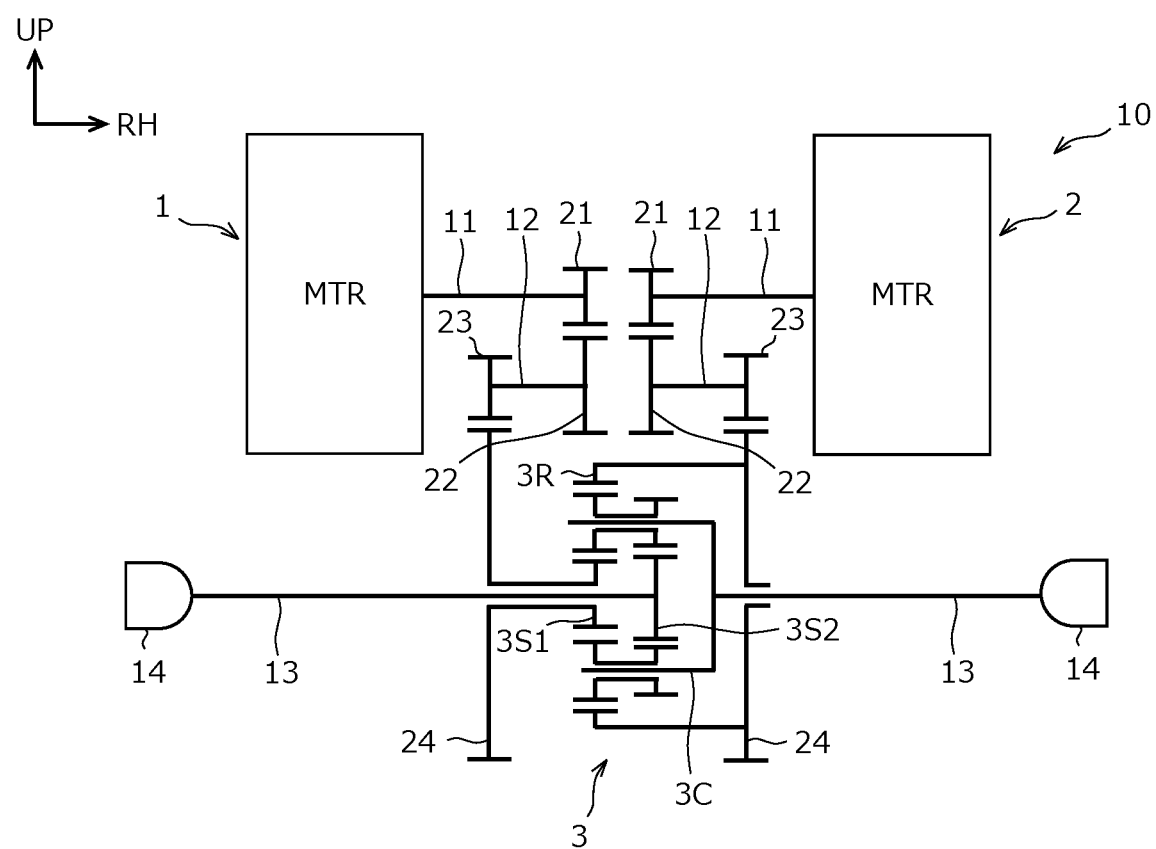
FIG. 2 is a skeleton diagram illustrating the left-right wheel driving device of the embodiment.

The gear mechanism 3 has a function for amplifying a torque difference at a predetermined amplification factor, and consists of, for example, a differential mechanism or a planetary gear mechanism. FIG. 2 shows an example of the gear mechanism 3 composed of a planetary gear mechanism.

This gear mechanism 3 is a double pinion planetary gear that has a sun gear 3S1 and a ring gear 3R as the input elements and also has a sun gear 3S2 and a carrier 3C as the output elements. The torque from the first motor 1 is input into the sun gear 3S1, and the torque from the second motor 2 is input into the ring gear 3R. The input elements are provided so as to rotate integrally with the output gear 24, which will be described below, and the output elements are provided so as to rotate integrally with the output shaft 13, which will be described below. The structure of the gear mechanism 3 is not limited to this, and may adapt any mechanisms having various alternative planetary gear mechanism or any mechanisms except for a planetary gear mechanism.

As shown in FIGS. 1 and 2, the driving device 10 of the present embodiment is provided with two sets of three shafts arranged in parallel, and a reduction gear train that reducing the speed in two stages is provided to these three shafts. Hereinafter, the three shafts are referred to as a motor shaft 11, a counter shaft 12, and an output shaft 13 in order from the upstream side of the power transmission path from the motors 1 and 2 to the left and right wheels. Two shafts are provided for each type of the shafts 11 to 13. As shown in FIG. 1, two motor shafts 11, two counter shafts 12, and two output shafts 13 positioned on the left and the right are configured similarly (symmetrically). Further, reduction gear trains provided to these shafts 11 to 13 are also configured similarly on the left and the right (i.e., symmetrically).

The motor shafts 11 are formed in hollow cylindrical shapes having the rotational centers C1, and positioned coaxially with the respective rotating shafts 1A and 2A of the left and right motors 1 and 2. Although the motor shafts 11 of the present embodiment is provided integrally with respective rotating shafts 1A and 2A, these elements may be separately provided and bound and coupled. Each motor shaft 11 is provided with a motor gear 21. The motor shafts 11 are positioned between the first motor 1 and the second motor 2 and are pivotally supported by non-illustrated bearings.

The counter shafts 12 are formed in hollow cylindrical shapes with rotational centers C2 and are disposed parallel to the motor shafts 11. Each counter shaft 12 is provided with a first intermediate gear 22 which meshes with the motor gear 21, and a second intermediate gear 23 having a diameter smaller than that of the first intermediate gear 22. The second intermediate gear 23 on the left is disposed closer to the first motor 1 side (on the left side) than the first intermediate gear 22 on the left, and the second intermediate gear 23 on the right is disposed closer to the second motor 2 side (on the right side) than the first intermediate gear 22 on the right. This means that the first intermediate gear 22 having a large diameter is disposed more inside in the vehicle width direction than the second intermediate gear 23 having a small diameter. Incidentally, these intermediate gears 22 and 23 are preferably disposed close to each other. The motor gear 21 and the first intermediate gear 22 collectively constitute the first reduction gear train.

Figure 3:
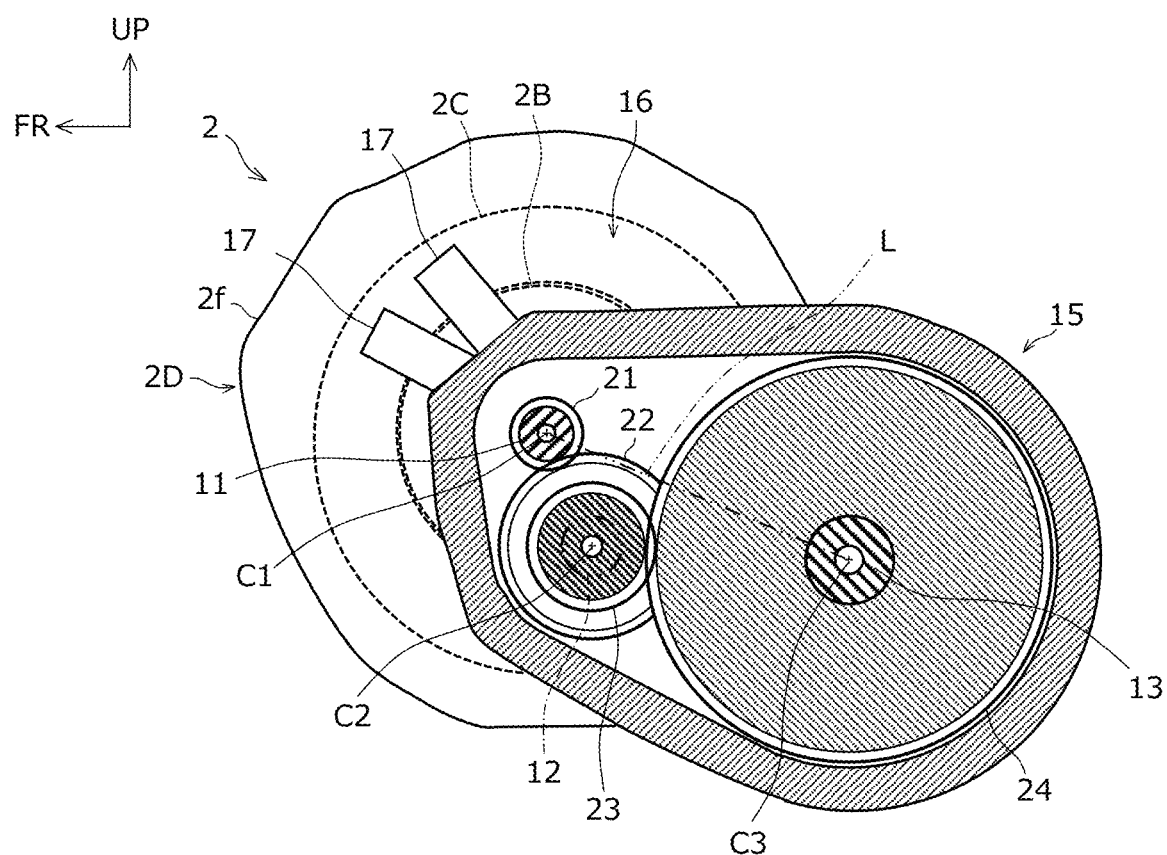
FIG. 3 is a sectional view taken along arrows A-A in FIG. 1.

The counter shafts 12 are positioned between the first motor 1 and the second motor 2 and is pivotally supported by a non-illustrated bearing. Further, as shown in FIG. 3, the counter shafts 12 are disposed such that the first intermediate gears 22 are positioned inside an outer circumference faces 1f and 2f in radius directions of the first motor 1 and the second motor 2 in a side view. That is, when viewed from the side of the vehicle, the gears 22 and 23 on counter shafts 12 are completely overlap the motors 1 and 2. Further, the counter shafts 12 of the present embodiment are disposed below an imaginary straight line L (two-dotted chain line) connecting the motor shafts 11 with the output shafts 13 in a side view with respect to the vehicle.

As shown in FIG. 1, the output shafts 13 are formed in hollow cylindrical shapes with rotational centers C3 and are disposed parallel to the motor shafts 11. Each output shaft 13 is provided with an output gear 24 that meshes with the second intermediate gear 23. The second intermediate gear 23 and the output gear 24 collectively constitute a second reduction gear train. These gears 21 to 24 are positioned on power transmission paths from the right and left motors 1 and 2 to the left and right wheels.

Each output gear 24 of the present embodiment has a cylindrical portion 24*b* provided integrally with a tooth portion 24*a* where the external teeth are formed, and the cylindrical portion 24*b* is provided to the output shaft 13 by being slidably outer-fitted to a part of the outer circumference face of the output shaft 13. The output gear 24 is, for example, a helical gear having helical teeth, and is the gear having the largest diameter incorporated in the driving device 10.

The gear mechanism 3 is disposed on one end side (inner side in the vehicle width direction) of each output shaft 13, and one of the left and right wheels is disposed on the other end side (outer side in the vehicle width direction) of the output shaft 13. That is, in the driving device 10, the left and right motors 1 and 2 are not disposed on the output shafts 13 provided with the left and right wheels but are disposed offset from the output shafts 13. Incidentally, FIG. 1 omits illustration of the left and right wheels, but shows joint parts 14 coupled to the left and right wheels.

The gear mechanism 3 is disposed between the output gear 24 on the first motor 1 side and the output gear 24 on the second motor 2 side. Assuming that the gear mechanism 3 is a planetary gear mechanism, the output shafts 13 are provided so as to rotate integrally with the output elements of the gear mechanism 3. For example, as shown in FIG. 2, the output elements (sun gear 3S2, carrier 3C) of the gear mechanism 3 and the output shafts 13 are provided so as to rotate integrally. The manner of coupling the output shafts 13 and the gear mechanism 3 is not limited to that shown in FIG. 2.

As shown in FIG. 1, each output shaft 13 is pivotally supported by two bearings 25 and 26 spaced apart from each other. Each output shaft 13 of the present embodiment is rotatably supported by the casing 15 by a structure that the cylindrical portion 24*b* outer-fitted to the output shaft 13 is pivotally supported by the bearings 25 and 26. The bearing 25 of one end side (inner side in the vehicle width direction) is disposed close to the tooth portion 24*a*, and the bearing 26 of the other end side (outer side in the vehicle width direction) is disposed on the end part of the cylindrical portion 24*b*. By reserving a wide interval between the two bearings 25 and 26, the output shaft 13 is stabilized.

The joint part 14 is provided at the end part on the outer side in the vehicle width direction of each output shaft 13. The joint parts 14 of the present embodiment are disposed outside an edge faces 1*e* and 2*e* of the first motor 1 and the second motor 2 in the vehicle width direction. In other words, the lengths of the output shafts 13 are set such that the joint parts 14 are positioned on the outer sides in the vehicle width direction of the edge faces 1*e* and 2*e* of the respective motors 1 and 2. Furthermore, as shown in FIG. 3, each output shaft 13 is disposed such that the output gear 24 partially overlap the first motor 1 and the second motor 2 in a side view.

As shown in FIG. 1, the casing 15 of the present embodiment is coupled to the respective motor housings 1D and 2D of the first motor 1 and the second motor 2, and contains the shafts 11 to 13, the gear mechanism 3 and the like. The casing 15 may be of a single body or may be of a combination of multiple parts. The upper face of the casing 15 is located nearer to the rotational center C1 than to the outer circumference faces 1*f* and 2*f* of the respective motor housings 1D and 2D. With this structure, the driving device 10 is provided with a recess part 16 positioned between the first motor 1 and the second motor 2 and also on the upper part of the casing 15. The recess part 16 is a portion that forms a space between the left and right motors 1 and 2, and also can be said to be a portion recessed inwardly of the casing 15.

Here, the rotors 1B and 2B and the stators 1C and 2C of the motors 1 and 2 emit heat in the course of operation and therefore requires to be cooled. The bearings that support the shafts 11 to 13 and the bearings in the gear mechanism 3 requires to be lubricated for smooth operation. For this purpose, the driving device 10 is provided with an inlet 17 for injecting oil for cooling and lubrication, paths for directing the injected oil to the motors 1 and 2 and the bearings, and a reservoir 18 for storing the oil.

Two inlets 17 are provided on the upper portion of the casing 15, and serve as openings (inlets) through which the oil is injected. The oil injected from each inlet 17 is fed into the interior of each of the motor housings 1D and 2D and into the interior of the casing 15. The inlets 17 of the present embodiment are disposed in a space (in the recess part 16) between the two motor housings 1D and 2D, and are provided on a projection formed in recess part 16. Incidentally, the oil injected from one of the two inlets 17 is guided to the first motor 1 side (left side), and the oil injected from the other inlet 17 is guided to the second motor 2 side (right side). FIG. 1 illustrates a case where two inlets 17 are arranged side by side in a direction perpendicular to the drawing, but the two inlets 17 may be arranged side by side in the vehicle width direction.

The driving device 10 of the present embodiment roughly has three paths for guiding the oil. The first path mainly has a function of cooling the rotors 1B and 2B and the stators 1C and 2C of the respective motors 1 and 2. The first path consists of, for example, respective inner spaces of the rotating shafts 1A and 2A of the first motor 1 and the second motor 2 and a hole portion (not shown) which is radially perforated at multiple points of the rotating shafts 1A and 2A.

The second path mainly has a function for lubricating the bearings that support the shafts 11 to 13. The second path consists of, for example, a portion located under the inlets 17 in the casing 15 and an opening portion (not shown) formed in a slit-shape on the respective motor shafts 11. The third path mainly has a function of lubricating the bearings in the gear mechanism 3. The third path consists of, for example, hole portions (not shown) penetrating the output shafts 13 in the radial direction, and a gap extending in the axis direction between each output shaft 13 and the corresponding cylindrical portion 24*b*. Note that the configuration of the paths for guiding the oil are not limited to these paths.

The reservoir 18 is provided in the lower part of the casing 15 and is a portion in the shape of a container that stores the oil that has dropped downward. The reservoir 18 is provided with a suction port (not shown), to which the oil path (not shown) is connected. The oil in the reservoir 18 is sucked from the suction port to the outside, and is injected again from the inlets 17 through the oil pump and the oil cooler (both not shown) provided on the oil path.

2. Actions and Effects (1) In the driving device 10 described above, since the left and right motors 1 and 2 are not disposed on the output shafts 13 (disposed offset from the output shafts 13), it is possible to shorten the dimension in the vehicle width direction of the driving device 10 as compared with a structure that the left and right motors are disposed on the output shafts. Furthermore, since having the counter shafts 12 each provided with two intermediate gears 22 and 23 and also having a three-shaft structure consisting of the motor shafts 11, the counter shafts 12, and the output shafts 13 arranged in parallel, the compact driving device 10 can be achieved which includes the reduction gear train that reduces the rotation speeds of the motors 1 and 2 and the gear mechanism 3 having a function for amplifying a torque difference.

(2) In the driving device 10 described above, since the second intermediate gear 23 having a small diameter of the two intermediate gears 22 and 23 provided in each counter shaft 12 is disposed on the side of the motor 1 or 2 (outer side in the vehicle width direction), the left and right output gears 24 meshing with the respective second gears 23 are spaced apart from each other. With this structure, since the gear mechanism 3 is disposed in the space between the left and right output gears 24, the output gears 24 can be disposed close to the gear mechanism 3. Consequently, the driving device 10 can be configured to be more compact.

(3) The counter shafts 12 described above are disposed such that the first intermediate gears 22 having large diameters are positioned inside in radius direction of the outer circumference faces 1f and 2f of the left and right motors 1 and 2 in a side view. That is, the counter shafts 12 and two intermediate gears 22 and 23 provided therein all fit within the diameter of the motors 1 and 2. Consequently, the driving device 10 can be configured to be more compact.

(4) Further, the output shafts 13 described above are disposed such that the output gears 24 partially overlap both of the left and right motors 1 and 2 in a side view. That is, since the output shafts 13 are disposed such that the counter shafts 12 come closer to the output gears 24, the driving device 10 can be configured to be more compact.

(5) The counter shafts 12 described above are disposed below the imaginary straight line L (two-dotted chain line in FIG. 3) connecting the motor shafts 11 with the output shafts 13 in a side view with respect to the vehicle. Thus, shifting the counter shafts 12 from the straight line L can reduce the dimension of the driving device 10, and further disposing the counter shafts 12 at a lower portion makes it possible to easily supply oil to the bearings that supports the counter shafts 12, so that the lubrication performance can be enhanced.

(6) In the driving device 10 described above, since the inlets 17 on the upper portion of the casing 15 are disposed at a space (recess part 16) between the two motor housings 1D and 2D, such a dead space can be efficiently used, which contributes to the size reduction of the driving device 10. Furthermore, providing the inlets 17 on the upper portion of the casing 15 makes it possible to supply oil inside the casing 15 and the motor housings 1D and 2D by utilizing the gravity and also enhance the lubrication performance.

(7) The output shafts 13 described above are each pivotally supported by two bearings 25 and 26 spaced from each other and the joint parts 14 provided at the ends thereof are disposed outside the edge faces 1e and 2e of the motors 1 and 2 in the vehicle width direction. This can reserve a wide interval between two bearings 25 and 26, so that each output shaft 13 can be stabilized. Furthermore, the joint parts 14 do not interfere with the respective motors 1 and 2. Therefore, it is possible to avoid interference of the output shafts 13 while reducing the dimension of the driving device 10.

3. Modification

The structure of the driving device 10 described above is an example, but is not limited to that described above. For example, the counter shafts 12 may be disposed over the straight line L connecting the motor shafts 11 with the output shafts 13 in a side view with respect to the vehicle, and the counter shafts 12 may be disposed such that the two intermediate gears 22 and 23 do not partially overlap the motors 1 and 2. Further, the output shafts 13 may be disposed such that the output gears 24 do not overlap the motors 1 and 2. Alternatively, the two intermediate gears 22 and 23 may be disposed opposite to the above (each first intermediate gear 22 having large diameter may be disposed on the side of the motor 1 or 2). Further alternatively, although description is made on an assumption that the motor shafts 11, the counter shafts 12, and the output shafts 13 are hollow, the shapes of the respective shafts 11 to 13 are not particularly limited.

Figure 4:
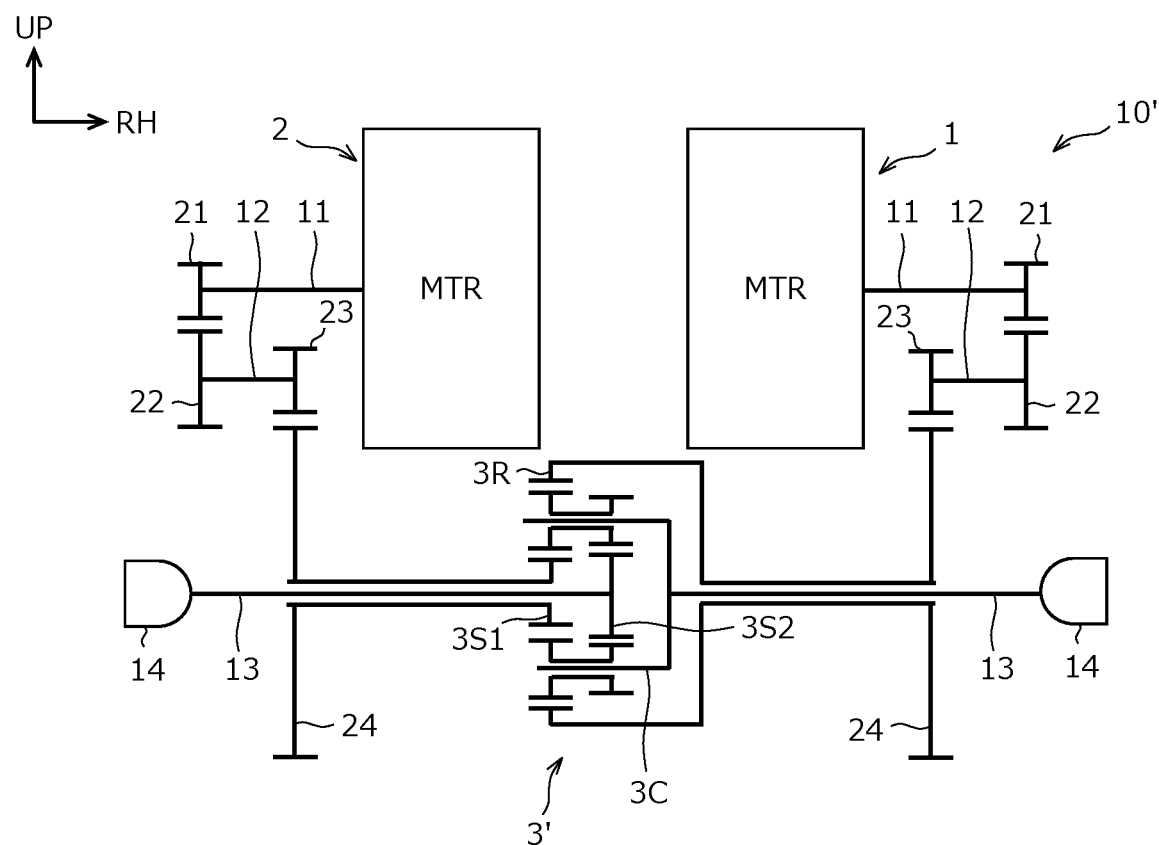
FIG. 4 is a skeleton diagram illustrating a left-right wheel driving device according to a modification.

In the driving device 10 described above, the left and right motors 1 and 2 are opposed to and spaced apart from each other such that the motor shafts 11 are disposed between the left and right motors 1 and 2, the arrangement of the motors 1 and 2 is not limited thereto. Alternatively, as shown in FIG. 4, the motor shafts 11 and the counter shafts 12 may be disposed outside in the vehicle width direction of the left and right motors 1 and 2, for example. In a gear mechanism 3' of this alternative, a right output gear 24 is provided separately from a ring gear 3R, and a cylindrical portion connecting the right output gear 24 with the ring gear 3R is provided.

In such a driving device 10', likewise the embodiment described above, since the left and right motors 1 and 2 are not disposed on the output shafts 13, it is possible to shorten the diameter in the vehicle width direction of the driving device 10'. Furthermore, since having the counter shafts 12 each provided with two intermediate gears 22 and 23 and also having the three-shaft structure consisting of the motor shafts 11, the counter shafts 12, and the output shafts 13 arranged in parallel, the compact driving device 10' can be achieved which includes a reduction gear train that reduces the rotation speeds of the motors 1 and 2 and the gear mechanism 3' having a function for amplifying a torque difference.

The shape of the casing 15 and the arrangement of the inlet 17 described above are not particularly limited. In cases where the casing 15 consists of divided components, not a single component, the inlets 17 are preferably provided to a casing (casing part) that contains at least the motor shafts 11. The paths of the oil supplied inside the casing 15 and the motor housings 1D and 2D from the inlets 17 are not limited to those described above. Alternatively, the dimensions in the vehicle width direction of the output shafts 13 may be set such that the joint parts 14 are positioned inside in the vehicle width direction of the respective edge faces 1e and 2e of the motors 1 and 2.

DESCRIPTION OF REFERENCE SIGNS first motor
1A rotating shaft 1D motor housing
1e edge face
1f outer circumference face
2 second motor
2A rotating shaft
2D motor housing
2e edge face
2f outer circumference face
3,3' gear mechanism
10, 10' driving device (left-right wheel driving device)
11 motor shaft
12 counter shaft
13 output shaft
14 joint part
15 casing
16 recess part
17 inlet
21 motor gear
22 first intermediate gear
23 second intermediate gear
24 output gear

The invention claimed is:

1. A left-right wheel driving device comprising:
a left motor on a vehicle left side and a right motor on a vehicle right side that each drive left and right wheels of a vehicle, and
a gear mechanism that amplifies a torque difference between the left motor and the right motor and transmits the amplified torques to the left and right wheels, wherein
a left rotating shaft portion which is a rotating shaft portion of the left motor and a right rotating shaft portion which is a rotating shaft portion of the right motor are coaxially disposed;
the left-right wheel driving device further comprises
  a left motor shaft portion extending from the left rotating shaft portion to the vehicle right side, positioned coaxially with the left rotating shaft portion, and provided with a left motor gear,
  a right motor shaft portion extending from the right rotating shaft portion to the vehicle left side, positioned coaxially with the right rotating shaft portion, and provided with a right motor gear,
  a left counter shaft disposed in parallel to the left motor shaft portion, provided with a left intermediate gear meshing with the left motor gear, and provided with a left second intermediate gear having a diameter smaller than that of the left first intermediate gear,
  a right counter shaft disposed in parallel to the right motor shaft portion, provided with a right first intermediate gear meshing with the right motor gear, and provided with a right second intermediate gear having a diameter smaller than that of the right first intermediate gear,
  a left output shaft disposed in parallel to the left motor shaft portion and provided with a left output gear meshing with the left second intermediate gear, and
  a right output shaft disposed in parallel to the right motor shaft portion and provided with a right output gear meshing with the right second intermediate gear:
the gear mechanism is disposed on a right end side of the left output shaft and a left end side of the right output shaft, between the left output gear and the right output gear;
the left and right wheels are disposed on a left end side of the left output shaft and a right end side of the right output shaft, respectively;
the left first intermediate gear is set such that sum of a diameter of the left first intermediate gear and a radius of the left motor gear is smaller than a length from a center of the left motor shaft portion to an outer circumference face of the left motor;
the right first intermediate gear is set such that sum of a diameter of the right first intermediate gear and a radius of the right motor gear is smaller than a length from a center of the right motor shaft portion to an outer circumference face of the right motor;
the left output gear partially overlaps the left motor in a side view and includes a left tooth portion in mesh with the left second intermediate gear and a left cylindrical portion axially extending from the left tooth portion to the vehicle left side;
the right output gear partially overlaps the right motor in a side view and includes a right tooth portion in mesh with the right second intermediate gear and a right cylindrical portion axially extending from the right tooth portion to the vehicle right side;
the left output shaft is rotatably supported by a casing by a structure that the left cylindrical portion outer-fitted to the left output shaft is pivotally supported by left bearings spaced apart from each other;
the right output shaft is rotatably supported by the casing by a structure that the right cylindrical portion outer-fitted to the right output shaft is pivotally supported by right bearings spaced apart from each other;
in a mounted state where the left-right wheel driving device is mounted on the vehicle, the left output shaft is at a lower height than a height of the left motor shaft portion, and the right output shaft is at a lower height than a height of the right motor shaft portion;
in a side view of the mounted state, the left counter shaft is at a lower height than an imaginary line connecting the left motor shaft portion with the left output shaft and the right counter shaft is at a lower height than an imaginary line connecting the right motor shaft portion with the right output shaft;
in the mounted state, a vertical position of a case upper face which is an upper face of the casing is lower than each position of respective upper ends of outer circumference faces of a left motor housing of the left motor and a right motor housing of the right motor; and
in the mounted state, a vertical length from the case upper face to the center of the left motor shaft portion is shorter than a vertical length from the case upper face to the upper end of the left motor housing, and a vertical length from the case upper face to the center of the right motor shaft portion is shorter than a vertical length from the case upper face to the upper end of the right motor housing.

2. The left-right wheel driving device according to claim 1, wherein
the second intermediate gear is disposed nearer to one of the first motor and the second motor than the first intermediate gear.

3. The left-right wheel driving device according to claim 2, wherein
the casing is coupled to the left motor housing and the right motor housing, and contains at least the left motor shaft portion and the right motor shaft portion;

the left-right wheel driving device further comprises
an inlet that is disposed on an upper part of the casing and that supplies oil inside the left motor housing, inside the right motor housing, and inside the casing; and
the inlet is disposed at a space between the left motor housing and the right motor housing.

4. The left-right wheel driving device according to claim 1, wherein
the casing is coupled to the left motor housing and the right motor housing, and contains at least the left motor shaft portion and the right motor shaft portion;
the left-right wheel driving device further comprises
an inlet that is disposed on an upper part of the casing and that supplies oil inside the left motor housing, inside the right motor housing, and inside the casing; and
the inlet is disposed at a space between the left motor housing and the right motor housing.

5. The left-right wheel driving device according to claim 4, further comprising three paths for guiding the oil supplied from the inlet, wherein:
a first one of the paths includes respective inner spaces of the left rotating shaft portion and the right rotating shaft portion, and respective hole portions radially perforated in the left rotating shaft portion and the right rotating shaft portion;
a second one of the paths includes respective opening portions formed in a slit-shape on the left motor shaft portion and the right motor shaft portion; and
a third one of the paths includes respective hole portions radially penetrating the left output shaft and the right output shaft, a gap between the left output shaft and the left cylindrical portion, and a gap between the right output shaft and the right cylindrical portion.

6. The left-right wheel driving device according to claim 1, wherein:
the left output shaft comprises a left joint part on a left end located outside in a vehicle width direction;
the right output shaft comprises a right joint part on a right end located outside in the vehicle width direction;
the left joint part is disposed on a left side of a left edge face of the left motor; and
the right joint part is disposed on a right side of a right edge face of the right motor.

7. The left-right wheel driving device according to claim 1, wherein:
the gear mechanism is a double pinion planetary gear having first and second input elements and first and second output elements;
the left cylindrical portion is connected to the first input element;
the right cylindrical portion is connected to the second input element;
the left output shaft is connected to the first output element; and
the right output shaft is connected to the second output element.

* * * * *